(12) United States Patent
Chang et al.

(10) Patent No.: US 9,449,397 B2
(45) Date of Patent: Sep. 20, 2016

(54) REAL-TIME VISUAL ODOMETRY SYSTEM FOR DETERMINING MOTION OF A MACHINE WITH A RANGE DETECTION UNIT

(71) Applicant: Caterpillar Inc., Peoria, IL (US)

(72) Inventors: Hong Chang, Peoria, IL (US); Paul Russell Friend, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 59 days.

(21) Appl. No.: 14/515,009

(22) Filed: Oct. 15, 2014

(65) Prior Publication Data

US 2016/0110878 A1 Apr. 21, 2016

(51) Int. Cl.
*G06K 9/00* (2006.01)
*G06T 7/20* (2006.01)
*G06K 9/52* (2006.01)

(52) U.S. Cl.
CPC ............. *G06T 7/20* (2013.01); *G06K 9/00791* (2013.01); *G06K 9/52* (2013.01)

(58) Field of Classification Search
None
See application file for complete search history.

(56) References Cited

U.S. PATENT DOCUMENTS

| | | | |
|---|---|---|---|
| 7,925,049 B2 | 4/2011 | Zhu et al. | |
| 8,238,612 B2 * | 8/2012 | Susca | G06T 7/2033 348/154 |
| 8,385,595 B2 | 2/2013 | Liu et al. | |
| 8,744,169 B2 | 6/2014 | Othmezouri et al. | |
| 9,251,587 B2 * | 2/2016 | Friend | G06T 7/0042 |
| 2004/0151250 A1 | 8/2004 | Witterbrood et al. | |
| 2009/0279741 A1 * | 11/2009 | Susca | G06T 7/2033 382/107 |
| 2010/0017128 A1 * | 1/2010 | Zeng | B60W 40/105 701/301 |
| 2012/0106828 A1 | 5/2012 | Yoon et al. | |
| 2013/0322698 A1 | 12/2013 | Modén | |
| 2014/0240501 A1 * | 8/2014 | Newman | G06T 7/0044 348/148 |
| 2014/0300732 A1 * | 10/2014 | Friend | G06T 7/0042 348/135 |

FOREIGN PATENT DOCUMENTS

| | | |
|---|---|---|
| EP | 0243493 A1 | 11/1987 |
| WO | WO 8702484 A1 | 4/1987 |
| WO | WO2013045932 * | 4/2013 |
| WO | WO 2014/092550 A2 | 6/2014 |

OTHER PUBLICATIONS

R. Wittebrood and G. de Haan, "Feature point selection for object-based motion estimation on a programmable device," Visual Communications and Image Processing 2002, published on Jan. 7, 2002 (11 pages).

* cited by examiner

*Primary Examiner* — Tahmina Ansari
(74) *Attorney, Agent, or Firm* — Finnegan, Henderson, Farabow, Garrett & Dunner, LLP (57) ABSTRACT

A motion determination system is disclosed. The system may receive a first camera image and a second camera image. The system may receive a first range image corresponding to the first camera image. The system may generate a first range map by fusing the first camera image and the first range image. The system may iteratively process a plurality of first features in the first range map to determine a change in position of the machine. The plurality of second features may correspond to the plurality of first features, and each of the plurality of first and second features is denoted by feature points in an image space of the camera.

20 Claims, 7 Drawing Sheets
(2 of 7 Drawing Sheet(s) Filed in Color)

REAL-TIME VISUAL ODOMETRY SYSTEM FOR DETERMINING MOTION OF A MACHINE WITH A RANGE DETECTION UNIT

TECHNICAL FIELD

The present disclosure relates generally to visual odometry techniques and more particularly, to systems and methods for motion estimation in real-time visual odometry systems.

BACKGROUND

Machines such as, for example, dozers, motor graders, wheel loaders, wheel tractor scrapers, and other types of heavy equipment are used to perform a variety of tasks at a worksite. Autonomously and semi-autonomously controlled machines are capable of operating with little or no human input by relying on information received from various machine systems. For example, based on machine movement input, terrain input, and/or machine operational input, a machine can be controlled to remotely and/or automatically complete a programmed task. By receiving appropriate feedback from each of the different machine systems during performance of the task, continuous adjustments to machine operation can be made that help to ensure precision and safety in completion of the task. In order to do so, however, the information provided by the different machine systems should be accurate and reliable. Parameters indicative of machine motion, e.g., velocity and change in position of the machine, are parameters whose accuracy may be important for control of the machine and its operation.

Some exemplary systems determine velocity and change in position based on vision systems, utilizing methods known as visual odometry. For example, an exemplary system that may be used to determine changes in position is disclosed in U.S. Pat. No. 8,238,612 to Susca et al. that issued on Aug. 7, 2012 (the '612 patent). The system in the '612 patent utilizes two optical cameras (stereo image) to obtain images at two different times. Based on changes between the images from the two cameras at different times, the system determines the translational and rotational movement of a mobile machine on which the cameras are mounted. In another embodiment, the system in the '612 patent utilizes a Light Detection and Ranging (LIDAR) device to obtain a 3D image of a scene at two different times. Based on changes between the LIDAR-based images, the system determines the translational and rotational movement of a mobile machine on which the LIDAR device is mounted.

Although the system of the '612 patent may be useful for determining various motions of a mobile machine, in some situations, a system which utilizes a single camera is desirable. For example, in the interest of saving initial costs and maintenance costs, a machine may be outfitted with only a single camera. A single camera does not provide the stereo image that is required by the system of the '612 patent. Furthermore, the LIDAR-based system of the '612 patent may not be suitable for uniform terrain.

The disclosed motion determination system is directed to overcoming one or more of the problems set forth above and/or other problems of the prior art.

SUMMARY

In one aspect, the present disclosure is directed to a motion determination system in a machine. The system may include one or more memories storing instructions, and a controller configured to execute the instructions to perform operations including receiving a first camera image and a second camera image from a camera, wherein the first camera image is received earlier in time than the second camera image. The operations may further include receiving, from a range detection unit, a first range image corresponding to the first camera image. The operations may further include generating a first range map by fusing the first camera image and the first range image. The operations may further include iteratively processing a plurality of first features in the first range map and a plurality of second features in the second camera image to determine a change in a position of the machine. The plurality of second features may correspond to the plurality of first features, and each of the first features and second features are denoted by feature points in an image space of the camera.

In another aspect, the present disclosure is directed to a computer-implemented method for determining motion of a machine. The method may include receiving a first camera image and a second camera image from a camera, wherein the first camera image is received earlier in time than the second camera image. The method may further include receiving, from a range detection unit, a first range image corresponding to the first camera image and the second camera image, respectively. The method may further include generating a first range map by fusing the first camera image and the first range image. The method may further include iteratively processing a plurality of first features in the first range map and a plurality of second features in the second camera image to determine a change in a position of the machine. The plurality of second features may correspond to the plurality of first features, and each of the first features and second features are denoted by feature points in an image space of the camera.

In yet another aspect, the present disclosure is directed to a machine including a range detection unit, a camera, and a controller configured to execute instructions to perform operations. The operations may include receiving a first camera image and a second camera image from the camera, wherein the first camera image is received earlier in time than the second camera image. The operations may further include receiving, from the range detection unit, a first range map corresponding to the first camera image and the second camera image, respectively. The operations may further include generating a first range map by fusing the first camera image and the first range image. The operations may further include iteratively processing a plurality of first features in the first range map and a plurality of second features in the second camera image to determine a change in a position of the machine. The plurality of second features may correspond to the plurality of first features, and each of the first features and second features are denoted by feature points in an image space of the camera.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
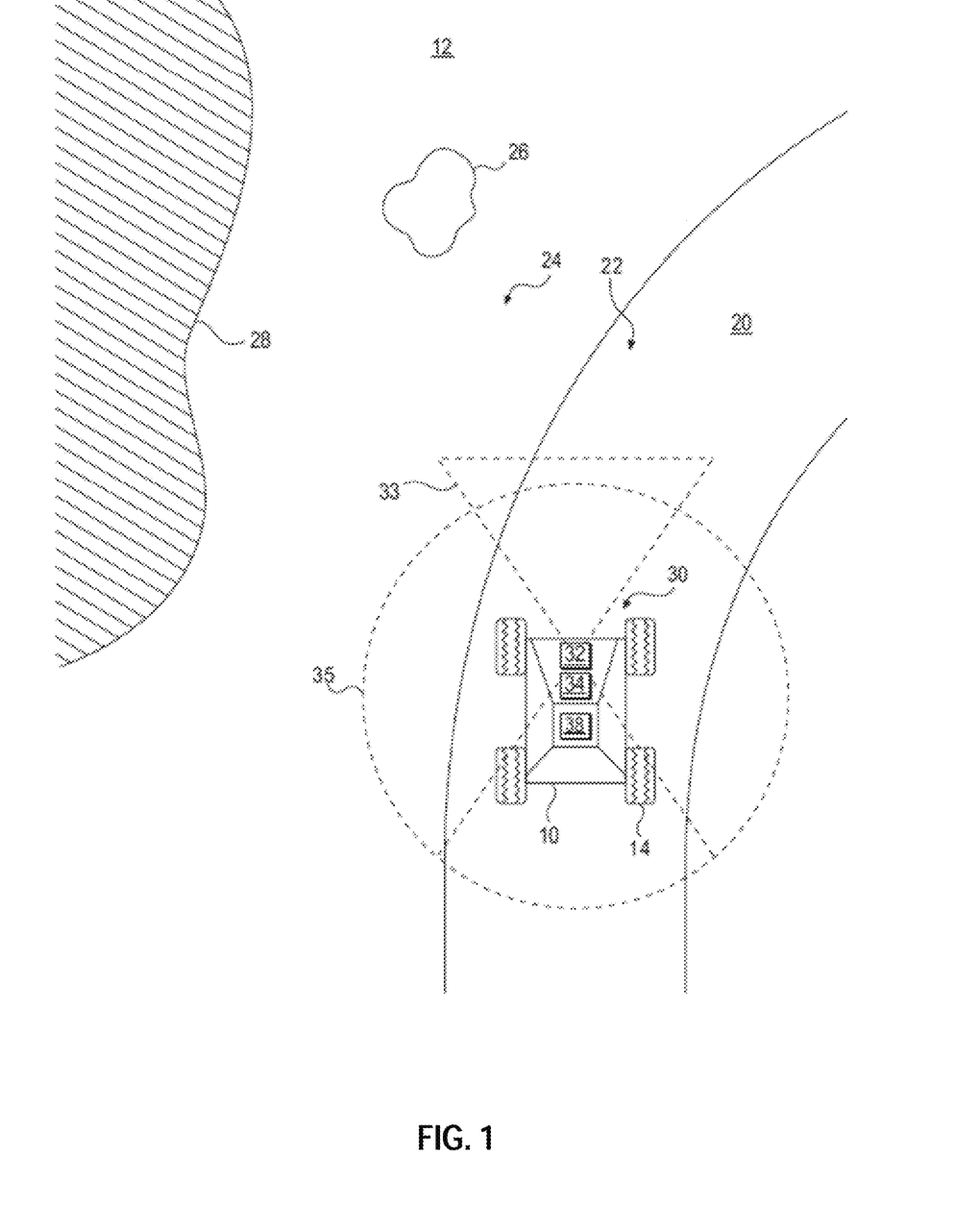
FIG. 1 is a pictorial illustration of an exemplary disclosed work machine on a worksite having an exemplary motion determination system.

FIG. 1 illustrates an exemplary machine 10. Machine 10 may be a mobile machine that performs one or more operations associated with an industry, such as mining, construction, farming, transportation, or any other industry, at a worksite 12. For example, machine 10 may be a load-moving machine, such as a haul truck, a loader, an excavator, or a scraper. Machine 10 may be manually controlled, semi-autonomously controlled, or fully-autonomously controlled. Machine 10 may generally include a power source (not shown), at least one traction device 14, and a motion determination system 30 for determining motion of machine 10. The power source may be connected to traction device 14, e.g., by a drivetrain, thereby driving traction device 14 to propel machine 10 within worksite 12. Traction device 14 may include wheels located on each side of machine 10. Alternatively, traction device 14 may include tracks, belts, or other known traction devices.

Worksite 12 may be a mine site or any other type of worksite traversable by machine 10. In some embodiments, worksite 12 may include various features. Features may be any characteristic, quality, and/or object of worksite 12. Exemplary features of worksite 12 may be a road 20, a dirt-covered portion 22 of the ground, a gravel-covered portion 24 of the ground, rocks 26, sidewalls 28 of worksite 12, and any other objects such as work signs, poles, dirt mounds, trees, and/or other machines, etc. or portions of such. Features may have various colors and/or shapes. In some situations, the ground of worksite 12 may be relatively flat. In other situations, the ground of worksite 12 may include variations in the contour of the ground and/or objects that protrude from the surface of the ground, such as rocks 26 or any other objects.

Figure 2:
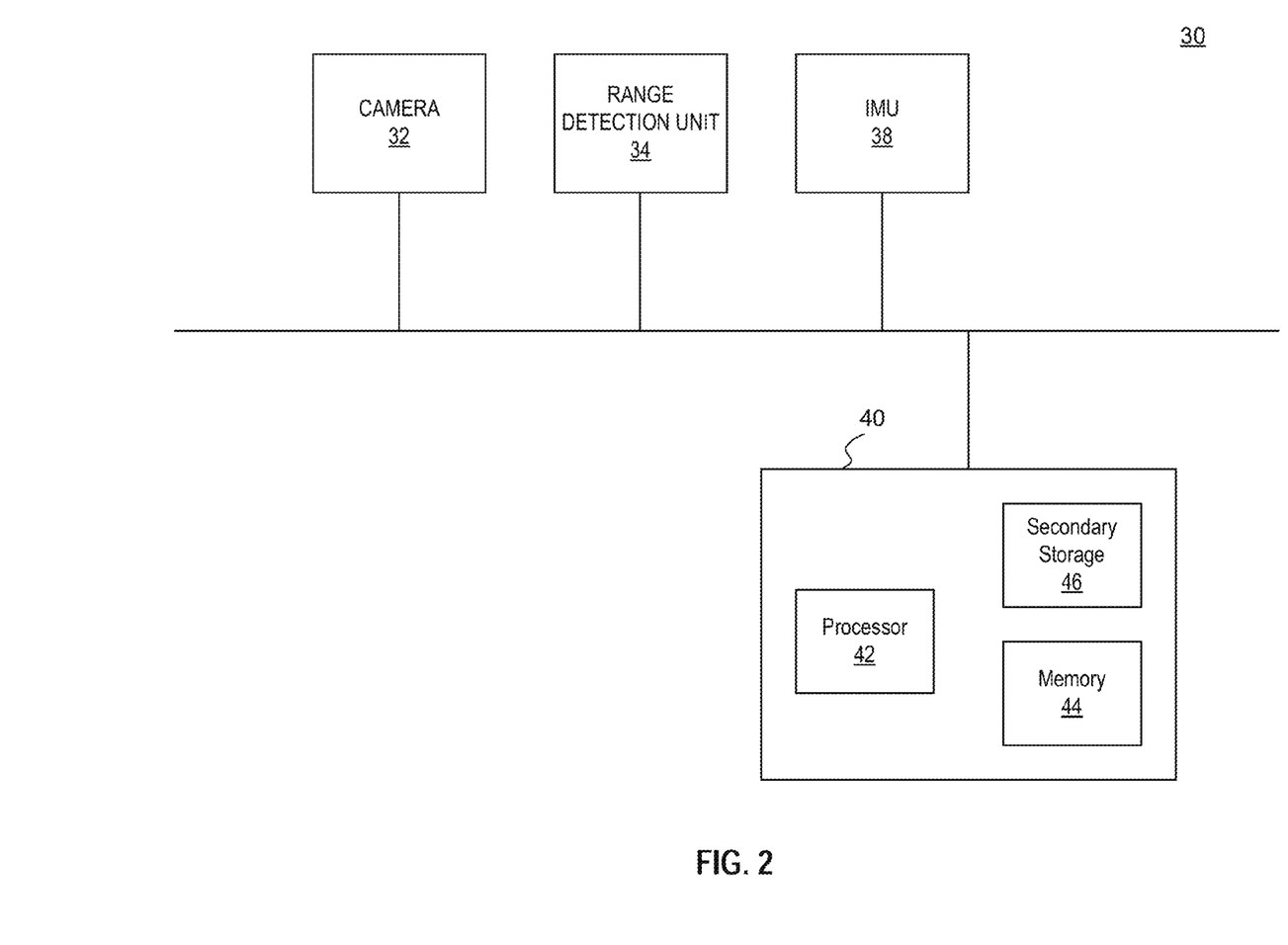
FIG. 2 is a diagrammatic illustration of the exemplary motion determination system of FIG. 1.

FIG. 2, in conjunction with FIG. 1, further describes an exemplary embodiment of motion determination system 30. Motion determination system 30 may include a camera 32, a LIDAR unit 34, an inertial measurement unit (IMU) 38, and controller 40. The above sensors and controller 40 may be connected to each other via a bus. In other embodiments, any suitable architecture may be used, including any combination of wired and/or wireless networks. Additionally, such networks may be integrated into any local area network, wide area network, and/or the Internet.

Camera 32 may be affixed to machine 10, for example, by being mounted to a body frame of machine 10. Camera 32 may take optical images of worksite 12 at successive time points. In some embodiments, camera 32 has a field of view 33 that determines the content of the images. Field of view 33 may be based on the view-angle of a lens of camera 32 and the orientation of camera 32 as mounted on machine 10. As machine 10 moves about worksite 12, the portion of worksite 12 within field of view 33 that is captured as a camera image changes.

Range detection unit 34 (e.g., LIDAR unit 34 in the embodiments described herein) may obtain depth information for objects in its field of view and such depth information may be referred to as range data. In other embodiments, motion determination system 30 may include other range detection units to provide range information, such as other perception sensors (e.g., a sonar device and/or radar device). LIDAR unit 34 may include a plurality of light sources, such as lasers. Each laser may generate a laser beam which is directed at various points of worksite 12. LIDAR unit 34 may further include one or more detector devices that receive the laser beams after reflection off of various points of worksite 12. Based on the time between generating the laser beam and receiving the reflected laser beam (referred to as time-of-flight measurements), motion determination system 30 may determine a distance to the corresponding point. In such a manner, motion determination system 30 may generate a 3D point cloud image representative of a part of worksite 12 that is detected by LIDAR unit 34. Each data point in this LIDAR image may include a distance from the LIDAR unit 34 to a detected point of worksite 12. This LIDAR image is in contrast with an optical camera image, in which each data point generally represents a color of the detected point. In an exemplary embodiment, LIDAR unit 34 may include 64 lasers, which may collectively obtain approximately one million points per LIDAR image. In other embodiments, LIDAR unit 34 may include more or less than 64 lasers and/or obtain more or less points per LIDAR image. In some embodiments, LIDAR unit 34 may generate a point cloud image that captures a full 360 degrees surrounding of machine 10. In other embodiments, LIDAR unit 34 may capture 270 degrees of the surroundings of machine 10 (as shown in FIG. 1, as field of view 35), or any other amount of the surroundings.

IMU 38 may include one or more devices that provide measurements of angular position, rates, and/or acceleration. For example, IMU 38 may include a 6-degree of freedom IMU, which includes a 3-axis accelerometer, a 3-axis angular rate gyroscope, and/or a 2-axis inclinometer. The 3-axis accelerometer may provide signals indicative of the acceleration of machine 10 in an x-, y-, and z-axis direction. The 3-axis angular rate gyroscope may provide signals indicative of the pitch rate, yaw rate, and roll rate of machine 10. The 2-axis inclinometer may provide the pitch angle and the roll angle, for example. Measurements from IMU 38 may include a bias offset or a bias drift. Bias offset is a constant error offset component in the measurement. Bias drift is a dynamic error offset component in the measurement. In addition, data that is generated from integrating measurements from IMU 38 may include a random walk error due to noise. That is, each measurement may include some error due to noise, which is then compounded by the integration of measurements. Such error may be unbounded. In various embodiments, the bias offset, bias drift, and/or noise model of IMU 38 may be known, either by conducting device characterization measurements or by referring to the device specifications data.

Controller 40 may include a processor 42, a memory 44, and a secondary storage 46, and any other components for running an application. Processor 42 may include one or more known processing devices, such as a microprocessor. Memory 44 may include one or more storage devices configured to store information used by controller 40 to perform certain functions related to disclosed embodiments. Secondary storage 46 may store programs and/or other information, such as information related to processing data received from one or more components of motion determination system 30, as discussed in greater detail below. When processor 42 executes programs stored in secondary storage 46 and loaded into memory 44, controller 40 may process signals received from camera 32, LIDAR 34, and/or IMU 38 and determine the motion of machine 10 based on the processed signals.

In one example, camera 32 may capture an image of a scene within field of view 33. At a successive moment in time, camera 32 may capture a new image in field of view 33 after machine 10 has moved forward a certain distance in that time. Controller 40 may identify features of worksite 12 captured in the two images that are common to both. For example, controller 40 may identify the boundary edge between dirt-covered portion 22 and gravel-covered portion 24 based on the different colors of the pixels in the captured images. Controller 40 may utilize this boundary edge as a feature, which shifts in position in a first image and a second image. LIDAR unit 34 may generate a first range image corresponding to the first image of camera 32. Controller 40 may combine the corresponding image from camera 32 and LIDAR unit 34 to generate a first range map. A range map may be an image where a data point identifies a feature captured by the camera image and a range associated with that feature. The range may represent a distance, from camera 32, of that feature of worksite 12. Based on the shift and the time elapsed during the shift between the first and second camera images, controller 40 may estimate various rates of motion (e.g., linear velocities in the x-, y-, and z-axis directions, and angular velocities in the yaw, roll, and pitch directions) of machine 10. FIGS. 3-7 depict flowcharts and diagrams depicting exemplary methods for determining the motion of machine 10 according to various disclosed embodiments. FIGS. 3-7 will be discussed in the following section to further illustrate the disclosed motion determination system and its operation.

By combining the various inputs, motion determination system 30 may provide a more accurate and/or more robust determination of the motion of machine 10 compared to relying on only one of the inputs. In some situations, a more accurate and/or robust determination of the motion of machine 10 may allow for more accurate positioning of machine 10. Furthermore, in some embodiments, because such determinations are more accurate and/or robust, machine 10 may be able to determine its position within worksite 12 for longer periods of time without relying on an absolute position measurement device, such as a Global Positioning System (GPS) device. Various exemplary methods by which controller 40 combines the inputs are described in further detail below.

In some exemplary embodiments, controller 40 may utilize a Kalman filter to combine derived measurements with direct measurements to determine the motion of machine 10. A Kalman filter is a mathematical method that may be used to determine accurate values of measurements observed over time, such as measurements taken in a time series. There are many Kalman filters that may be used to perform this combining, including, for example, simple Kalman filter, Kalman-Bucy filter, extended Kalman filter, and/or square-root Kalman filter. Generally common to all Kalman filters is a propagation phase and a measurement update phase. In the propagation phase, derived measurements may be utilized to obtain estimates of motion or position. For example, the Kalman filter may integrate linear and angular rates to estimate the position (location and/or angular orientation) of machine 10. In addition, the Kalman filter may provide estimated uncertainties corresponding to the estimated position. With iterations of the estimation step of the Kalman filter, the estimated uncertainties may grow and be unbounded. In the measurement update phase, direct measurements from camera 32, LIDAR unit 34, and/or IMU 38 may be utilized to update the estimated position from the propagation phase. With the update phase, the estimated uncertainties of a final determination may be bounded to the measurement error.

The next section describes with reference to FIGS. 3-7 flowcharts and diagrams depicting exemplary methods for determining the motion of machine 10 according to various disclosed embodiments.

INDUSTRIAL APPLICABILITY

The disclosed motion determination system 30 may be applicable to any machine, such as machine 10, for which motion determination is desired. The disclosed motion determination system 30 may provide for this need through the use of methods described herein, which may be performed by controller 40, for example. Operation of motion determination system 30 will now be explained with respect the FIGS. 3-7.

Figure 3:
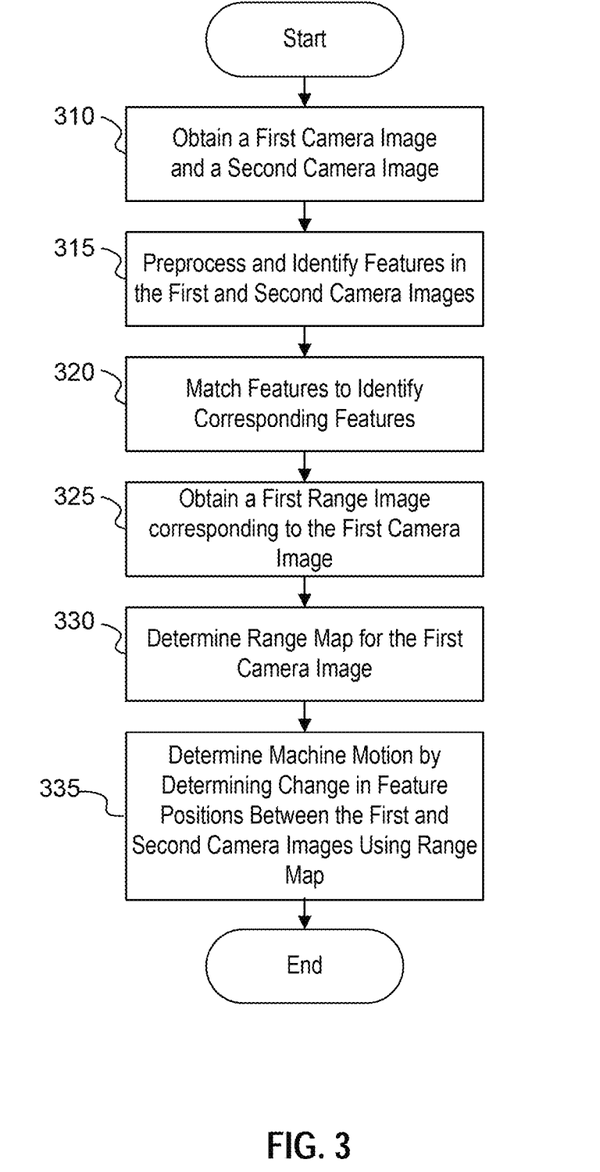
FIG. 3 is a flowchart depicting an exemplary disclosed method that may be performed by the motion determination system of FIG. 2.

FIG. 3 depicts a flowchart showing an exemplary method for combining inputs from camera 32 and a range detection unit, such as LIDAR unit 34, to determine the motion of machine 10. At Step 310, controller 40 may obtain a first camera image and a second camera image of worksite 12 from camera 32. The first camera image and second camera image may be obtained at successive points in time. For example, the first camera image may be obtained at an earlier time than the second camera image. During the time that elapses between when the first camera image is taken and when the second camera image is taken, machine 10 may be moving. Therefore, the first camera image and the second camera image may differ according to the motion of machine 10.

Figure 4:
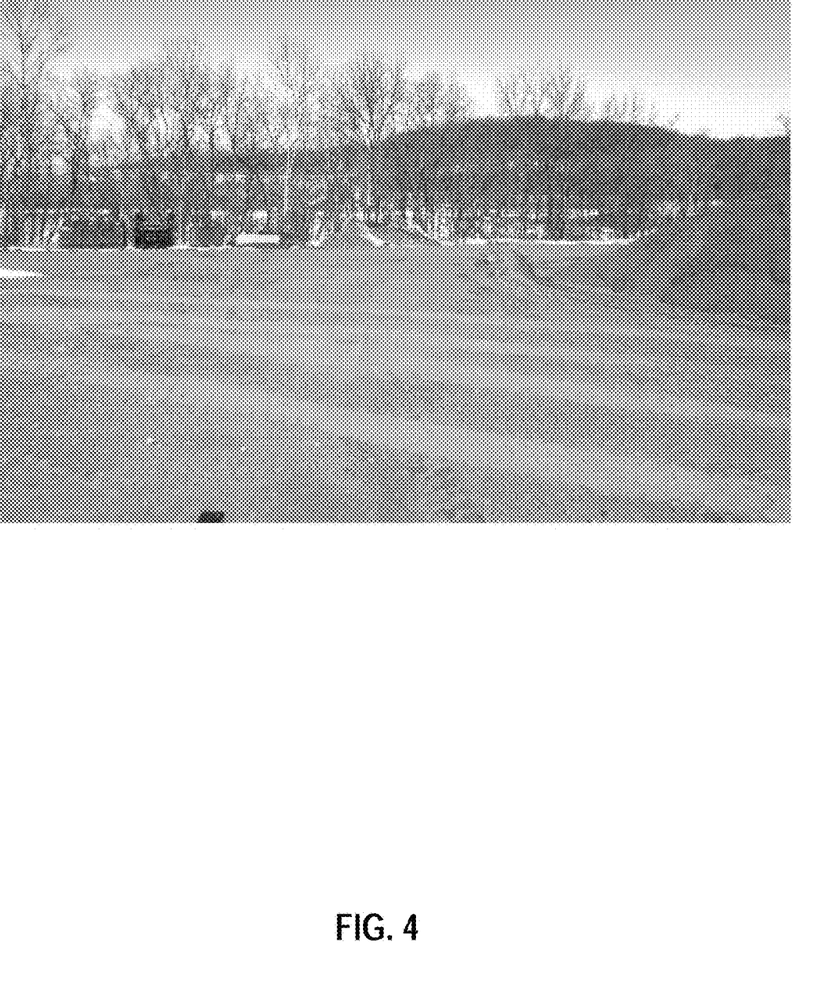
FIGS. 4 and 5 illustrate an exemplary camera image, and a 3D point cloud overlaid on the camera image, respectively.
Figure 5:
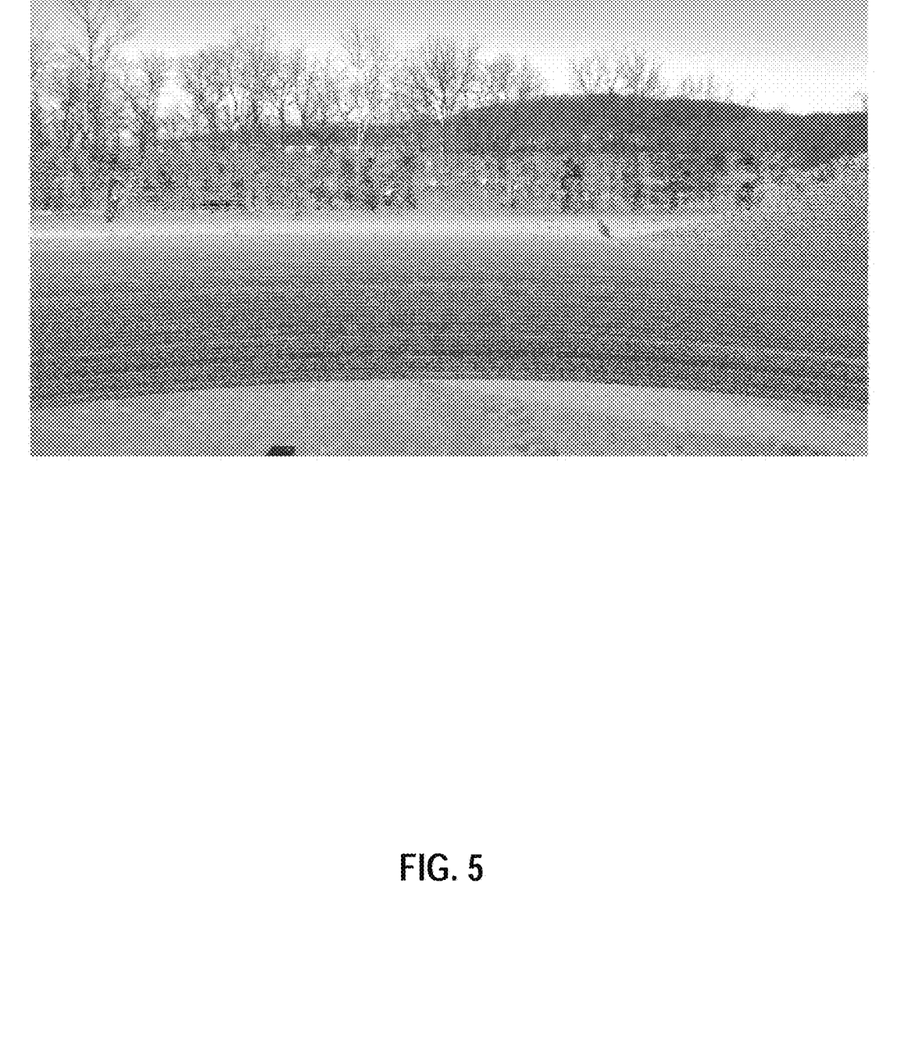

At Step 315, controller 40 may preprocess and identify features in the first and second camera images obtained at step 310. These features may be detected based on various predetermined discriminators that include, for example, color, brightness, or other characteristics of the images. The camera images may be preprocessed by, for example, removing that portion of the camera image that does not overlap with a corresponding 3D point cloud from LIDAR unit 34. For example, FIG. 4 illustrates a camera image, and FIG. 5 illustrates the overlaying of the 3D point cloud on the camera image. The portion of the camera image that does not overlap with the 3D point cloud from LIDAR unit 34 may either be cropped or simply not considered in the following steps.

At Step 320, controller 40 may match features to identify corresponding features in the first and second camera images. In one example, for a given pixel or group of pixels in a first camera image, controller 40 may determine attribute values, such as color or brightness, of neighboring pixels. Controller 40 may then identify a pixel or group of pixels in the second camera image with a set of neighboring pixels that match or correspond to those determined for the first camera image. Based on this identification, controller 40 may determine that the pixel or group of pixels in the first camera image and in the second camera image include corresponding features. In various other embodiments, controller 40 may perform other methods of identifying features and matching features between the first camera image and the second camera image, as known in the art.

At Step 325, controller 40 may obtain a first range image from LIDAR unit 34. The first range image may correspond to the first camera image. For example, the first range image may be obtained at substantially the same time that the first camera image is obtained. As an example, the first range image may be in the form of 3-dimensional (3D) point clouds where each point has a 3D position (X, Y, Z) with respect to the LIDAR unit 34.

At step 330, controller 40 may determine a range map for the first camera image based on the first range image. The range map may be determined by any well-known technique. As one example, the range map may be determined by fusing the first camera image and the range image such that one or more features in the camera image have now an associated 3D position and range (e.g., distance) from camera 32. To fuse a camera and corresponding range image, controller 40 may transform the 3D point cloud from LIDAR coordinates to camera coordinates to account for any position differences between LIDAR unit 34 and camera 32. Controller 40 may project the transformed 3D point cloud into a 2-dimensional (2D) camera image space of camera 32 taking into account the intrinsic camera calibration information (e.g., focal length and center of projection). If the 2D camera image space axes are designated by u, v, then each of the features identified in the camera image have a corresponding position (u, v). For example, if the camera resolution is 640×480, the camera image space may span 640×480 pixels with each pixel having a unique (u, v). By virtue of the projection of the 3D point cloud, each feature in the camera image space can be associated with a corresponding 3-D position (X, Y, Z) and a range '1' from camera 32. Accordingly, a range map may be generated using the above steps so that a given feature in the camera image space may have corresponding range or depth information. Fusing this information together may provide more useful information for motion estimation and for the site or machine operator.

Figure 6:
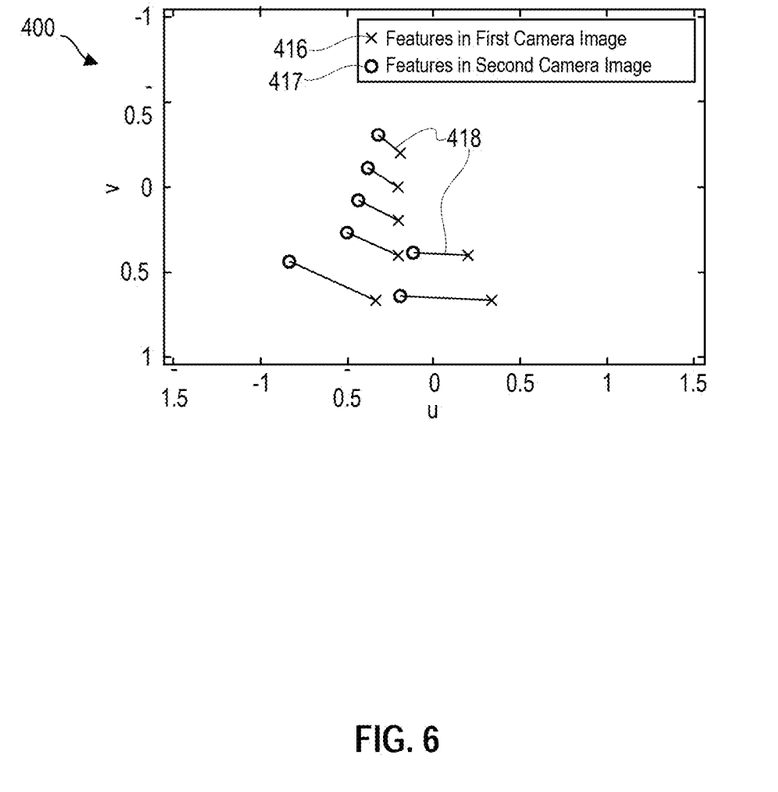
FIG. 6 illustrates exemplary feature matching between two camera images.
Figure 7:
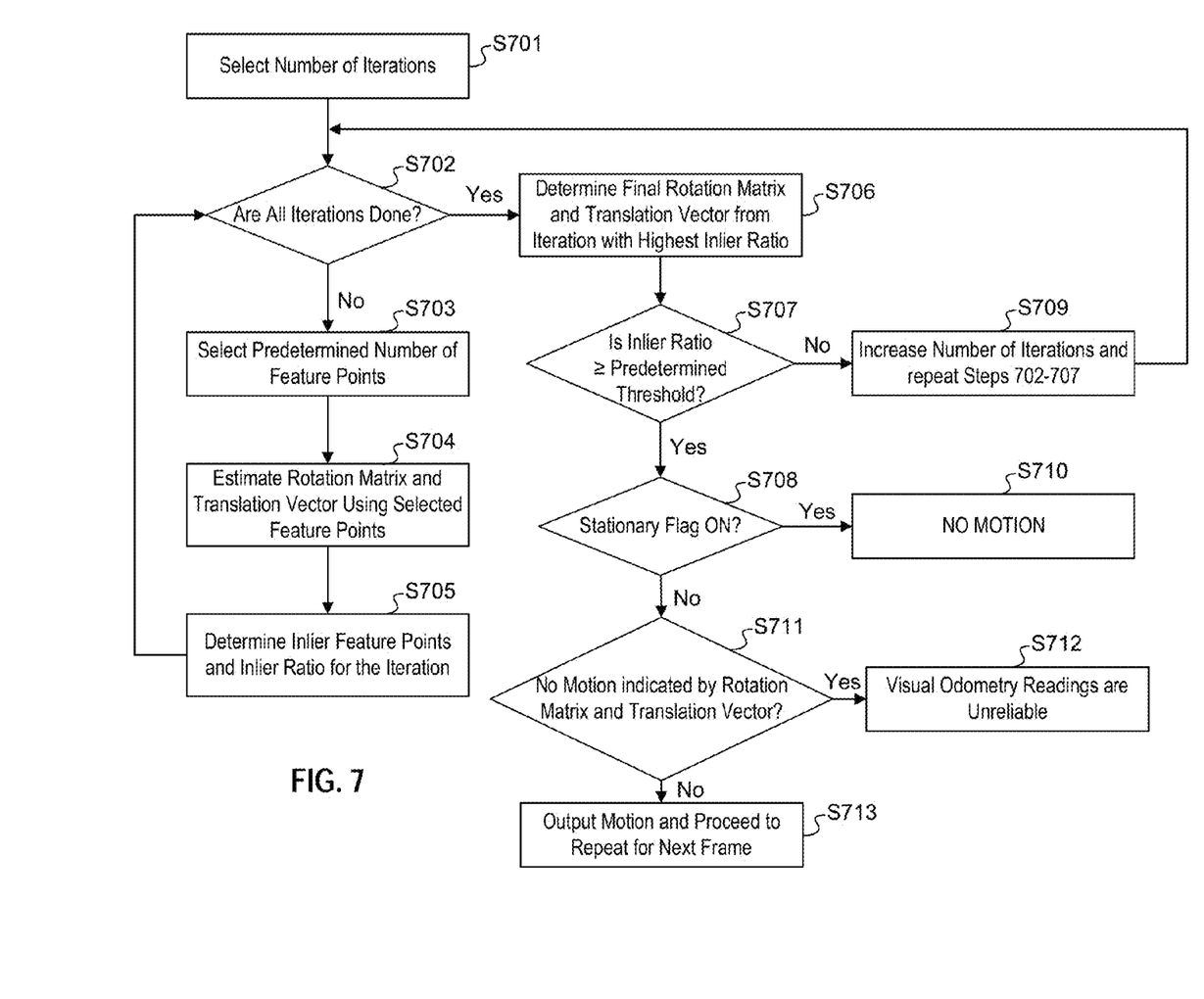
FIG. 7 is a flowchart depicting an exemplary disclosed method that may be performed by the motion determination system of FIG. 2.

At step 335, controller 40 may determine machine motion by determining a change in feature positions between the first and second camera images using the range map. For example, controller 40 may determine the relative change in position of common features within the field of view of camera 32, as captured in the first camera image and the second camera image. Graph 400 in FIG. 6 shows features in the first camera image space, indicated by markers 416, and features in the second camera image space, indicated by markers 417. Corresponding features of the first camera image and the second camera image in the camera 32 image space are connected by lines 418. Utilizing the corresponding 3-D position (X, Y, Z) and a range '1' for one or more of these features, controller 40 may determine the translation and/or rotation of machine 10. Translation of machine 10 may correspond to a change in the position of machine 10 along x-, y-, and z-axes of camera 32. The rotation of machine 10 may correspond to a change in the machine position along the yaw, roll, and pitch directions. Based on the determined translation and/or rotation, controller 40 may determine, for example, 6 degrees of velocities of machine 10. For example, controller 40 may divide the translation and rotation by the elapsed time that occurred between the capture of the first camera image and the second camera image to obtain a rate of change, i.e. velocities, in the x, y, and z directions and the yaw, roll, and pitch directions. In some embodiments, controller 40 may utilize more than two image frames (i.e., a third image, fourth image etc.), and average to reduce errors. Once controller 40 has determined the velocities of machine 10, controller 40 may utilize the velocities to determine the position of machine 10. For example, controller 40 may integrate the velocities and add the result of the integration to a previous position to obtain a new position of machine 10. FIG. 7 describes in further detail exemplary operations performed by controller 40 to execute step 335 and determine machine motion by determining change in feature positions between the two camera images determined in step 330.

FIG. 7 illustrates an exemplary motion estimation method that utilizes an iterative technique, e.g., an adaptive Random Sample Consensus (RANSAC) technique, to determine machine motion. The exemplary iterative technique may utilize the two camera images from step 310, and range map from step 330 to determine, via iteration, a model for a rotation matrix and a translation vector that approximately describes a rotation and translation between the two camera images. At step 701, controller 40 may select a number of iterations to be executed for the first and second camera images. The number of iterations may be selected based on a desired robustness percentage and a desired number of inlier points ratio ("inlier ratio"). The inlier ratio may refer to a ratio between (a) the total number of common feature points in the first and second camera images that fit a calculated rotation matrix and a translation vector, and (b) the total number of common feature points in the first and second camera images. For example, consider a situation in which there are 200 common features in the first and second camera images. Now, if controller 40 estimates a model (e.g., a rotation matrix and a translation vector between the two camera images) and 160 features (and more particularly, corresponding feature points in the camera 32 image space) fit the model, then the inlier ratio is 0.8.

Back to step 701, controller 40 may select the number of iterations based on a desired robustness percentage and desired inlier ratio. As an example, controller 40 may utilize the following equation to determine the number of iterations 'N'

$$N = \frac{\log 2(1-p)}{\log 2(1-r^3)} \quad (1)$$

where 'p' is the robustness percentage desired and 'r' is the desired inlier ratio. For example, using p=99%, r=1/3, the number of iterations 'N' is 126. It will be apparent that these numbers for p and r are exemplary.

At step 702, controller 40 may check if all N iterations have been completed. If not, controller 40 may begin by executing a single iteration (e.g., steps 703, 704, 705). At step 703, controller 40 may select a predetermined number of feature points for the model estimation. For example, controller 40 may select three feature points randomly from the common features of the two camera images. In one embodiment, controller 40 may select the three feature points such that they are non-collinear and the distance between each pair of points is at least certain meters away so that those points are not clustered in the same area. It will be understood that the number three is simply an example, and controller 40 may select more number of points (e.g., 4, 5, 8).

At step 704, controller 40 may estimate a rotation matrix and a translation vector between the two camera images using the selected feature points. As an example, the rotation and translation of machine 10 may be determined using the following perspective projection model:

$$\lambda x = K(RX+t) \quad (2)$$

where: $X=(X\ Y\ Z)^T$ is the 3D position of a feature point; $x=(u\ v\ 1)^T$ are the pixel coordinates of the feature point in the camera image space; $\lambda$ is the range of the feature point; K is a 3×3 camera calibration matrix; R is a 3×3 rotation matrix; and $t=(t_x\ t_y\ t_z)^T$ is the translation. The camera calibration matrix, K, accounts for intrinsic parameters of the camera, e.g., focal length of the camera lens, and can be eliminated by multiplying each side by its inverse. On the left side of equation 2, $x'\rightarrow K^{-1}x$, is a transformation into normalized coordinates. Below, it is assumed that all image coordinates are normalized, and thus the prime symbol is dropped for simplicity.

The coordinate system can be defined with respect to the first image, and hence the rotation is the identity and translation is zero. Given image coordinates, $x_1$, in frame 1, and known range $\lambda_1$ from the range map of the first camera image, the 3D position of a feature point in the first camera image can be determined: $X=\lambda_1 x_1$. This position X remains unchanged in frame 2 and is projected into image coordinates $x_2$. The equation for these coordinates, $\lambda_1 x_1 = RX+t$, can be simplified as follows:

$$\lambda_2 \begin{pmatrix} u \\ v \\ 1 \end{pmatrix} = \begin{pmatrix} r_1 \\ r_2 \\ r_3 \end{pmatrix} X + \begin{pmatrix} t_x \\ t_y \\ t_z \end{pmatrix}, \quad (3)$$

where $r_i$ is the $i^{th}$ row of R. Eliminating the unknown depth, $\lambda_2$, yields:

$$\begin{pmatrix} u \\ v \end{pmatrix} = \frac{1}{r_3 X + t_z} \begin{pmatrix} r_1 X + t_x \\ r_2 X + t_y \end{pmatrix} \quad (4)$$

This equation is non-linear, but can be made linear (ignoring rotation constraints for now) by multiplying through by the denominator:

$$\begin{pmatrix} u(r_3 X + t_z) - (r_1 X + t_x) \\ v(r_3 X + t_z) - (r_2 X + t_y) \end{pmatrix} = 0 \quad (5)$$

Rotation constraints can be incorporated by using a first order expansion of Rodriguez formula for the rotation matrix R. Let $\Omega=(\Omega_1\ \Omega_2\ \Omega_3)^T$ represent the axis of rotation and its magnitude the angle. Then to first order a small rotation is given by:

$$R \approx \begin{pmatrix} 1 & -\Omega_3 & \Omega_2 \\ \Omega_3 & 1 & -\Omega_1 \\ -\Omega_2 & \Omega_1 & 1 \end{pmatrix} \quad (6)$$

Substituting these values into the above equation and rearranging, yields:

$$\begin{pmatrix} uY & -uX-Z & Y & -1 & 0 & u \\ uY+Z & -vX & -X & 0 & -1 & v \end{pmatrix} \begin{pmatrix} \Omega \\ t \end{pmatrix} = \begin{pmatrix} X-uZ \\ Y-vZ \end{pmatrix} \quad (7)$$

Attempting to solve equation 7 for one point results in two equations and six unknowns. With at least three points, however, equation 6 includes sufficient equations to directly solve for the rotation and translation. A direct least squares solution will generate values for $\Omega$ and t. An exact rotation matrix R may be obtained from $\Omega$ by using the full Rodriguez equation. If the actual rotation is not small, then the estimate can be refined by substituting $X \rightarrow RX$, and repeating a few times. Convergence can be rapid. By multiplying through by the denominator, an image-error cost function was changed. The image-error cost function can be approximated by weighting each point equation with 1/Z in the least squares estimate. Based on the above exemplary technique, controller 40 may determine rotation matrix R and the translation vector t for the three selected feature points.

At step 705, controller 40 may determine the inlier feature points and the inlier ratio for the current iteration. For example, controller 40 may determine all the inlier feature points amongst all the common feature points in the two camera images and a corresponding inlier ratio (e.g., ratio of all inlier feature points to total number of common feature points in the two camera images). To determine the inlier feature points, controller 40 may reconstruct the feature points of the second camera image using the feature points of the first camera image and the calculated rotation matrix R and the translation vector t. For example, consider a first camera image with feature points a(1), b(1), c(1), d(1) and a second camera image with corresponding feature points a(2), b(2), c(2), and d(2). If the model was estimated using feature points a(1), b(1), c(1), a(2), b(2), c(2), then one can reconstruct each of three first camera image feature points using the three second camera image feature points. For example, a(2) can be reconstructed using a(1), the rotation matrix R, and the translation vector t using equation 4 where X would be the 3-D position of a(1) relative to camera 32. The 3-D position of a(1) would be available from the range map of the first camera image.

But controller 40 may or may not be able to accurately reconstruct d(2) accurately using d(1) because the model may not accurately capture the rotation and translation between d(1) and d(2). Therefore, to figure out whether d(2) is an inlier, controller 40 may determine a d(2)' using d(1), the rotation matrix R, and the translation vector t. If d(2)' is within a predetermined tolerance of d(2), then d(2) may be counted as an inlier. To determine whether d(2) is an inlier, controller 40 may determine whether:

$$|d(2)'-d(2)| < M \text{ pixels} \quad (9)$$

where M pixels is a predetermined tolerance.

Based on the above, controller 40 may calculate an inlier ratio (e.g., ratio of all inlier feature points to total number of common feature points in the two camera images) for the current iteration. Controller may repeat steps 702-705 and calculate an inlier ratio for each iteration until N iterations have finished (S702: Yes). At step 706, controller 40 may determine a final rotation matrix and translation vector using the iteration with the highest inlier ratio. For example, if controller 40 determines that the highest inlier ratio was for iteration 79, controller 40 may obtain all the inlier feature points from iteration 79 (which gave the inlier ratio) and estimate a final rotation matrix (R(Final)) and final translation vector t(final) using them. Exemplarily, controller 40 may utilize equations (2)-(7) to determine R(Final) and t(Final).

At step 707, controller 40 may determine whether the inlier ratio (from step 706) is greater than or equal to a predetermined threshold. If, for example, the highest inlier ratio is lower than a predetermined threshold (e.g., r=1/3), it is possible that the model calculated in step 706 is not accurate or representative of the actual rotation and translation between the two range maps. If the highest inlier ratio (from step 706) is less than the predetermined threshold (step 707: No), controller 40 may, in step 709, increase the number of iterations and repeat steps 702-707. For example, controller 40 may increase the number of iteration to say 2*N or 5*N and repeat steps 702-707 for the same two frames. While not shown in FIG. 7, controller 40 may not endlessly keep on increasing the number of iterations until the highest inlier ratio exceeds the predetermined threshold. In one embodiment, controller 40 may attempt to increase the number of iterations a few times and if the inlier ratio still does not exceed the predetermined threshold, controller 40 may skip the remaining steps and return to step 701 for successive frames and their range maps.

If controller 40 determines that the inlier ratio (from step 706) is greater than or equal to the predetermined threshold (step 706: Yes), controller 40 may determine, in step 708, whether a stationary flag is ON. For example, controller 40 may determine whether machine 10 is stationary based on input from IMU 38. If the stationary flag is ON (step 708: Yes), controller 40 may disregard the visual odometry calculations above and signal no motion. Such a situation may occur, for example, when a portion of worksite 12 captured in the range maps is not stationary with respect to machine 10, even though machine 10 is not moving. If utilizing camera-based visual odometry without any additional information, controller 40 may determine that machine 10 is moving from the left to the right due to the fact that successive camera images are shifting from the right to left, for example. However, this determination would be incorrect, as the shift in images is in fact due to the other machine moving in front of machine 10, from the right to the left.

If the stationary flag is not ON (step 708: No), controller 40 may determine in step 711 whether no motion is indicated by R(Final) and t(Final). If no motion is indicated by R(Final) and t(Final) (step 711: Yes), controller 40 may determine in step 712 that the visual odometry readings are unreliable. At that time, controller 40 may either move on to the next frames or set a flag for the system operator to check if something is wrong with the visual odometry system.

If motion is indicated by R(Final) and t(Final) (step 711: No), controller 40 may output in step 713 motion of machine 10 and proceed to repeat the algorithm of FIG. 7 for the next frames. For example, controller 40 may output R(Final) and t(Final). Controller 40 may also output a rate of change, i.e. velocities, in the x, y, and z directions and the yaw, roll, and pitch directions.

Accordingly, using the above techniques, machine motion may be determined by fusing image data from a camera unit and a LIDAR unit. The visual-odometry techniques described herein may provide six-degree velocity measurements and the position of a machine relative to a starting point. Furthermore, the visual-odometry techniques described herein may be computationally less intensive and amenable to real-time applications.

It will be apparent to those skilled in the art that various modifications and variations can be made to the disclosed motion determination system. Other embodiments will be apparent to those skilled in the art from consideration of the specification and practice of the disclosed techniques. For example, the steps described need not be performed in the same sequence discussed or with the same degree of separation. Likewise, various steps may be omitted, repeated, or combined. It is intended that the specification and examples be considered as exemplary only, with a true scope being indicated by the following claims and their equivalents.

What is claimed is:

1. A motion determination system in a machine, comprising:
   one or more memories storing instructions;
   a camera mounted on the machine;
   a range detection unit mounted on the machine; and
   a controller configured to execute the instructions to perform operations including
      receiving a first camera image and a second camera image from the camera, wherein the first camera image is received earlier in time than the second camera image,
      receiving, from the range detection unit, a first range image corresponding to the first camera image,
      generating a first range map by fusing the first camera image and the first range image, and
      iteratively processing a plurality of first features in the first range map and a plurality of second features in the second camera image to determine a change in position of the machine,
   wherein the change in position of the machine includes a rotation of the machine and a translation of the machine, and determining the rotation of the machine is based at least in part on the first range map,
   the plurality of second features correspond to the plurality of first features, and
   each feature of the plurality of first features and each feature of the plurality of second features are denoted by feature points in an image space of the camera.

2. The system of claim 1, wherein the range detection unit is a LIDAR unit, and the first range image is a 3D point cloud.

3. The system of claim 1, wherein the iterative processing includes selecting a first number of iterations based on a desired robustness and a desired inlier ratio,
   the inlier ratio is a ratio between a total number of inlier feature points from among the plurality of first feature points that fit an estimated model, and a total number of feature points in the plurality of first feature points, and
   the estimated model describes a rotation and a translation, respectively, between the first camera image and the second camera image.

4. The system of claim 3, wherein the iterative processing further includes, for each iteration of the first number of iterations, the following operations:
   selecting a plurality of third feature points from among the plurality of first feature points and a plurality of fourth feature points from among the plurality of second feature points, the plurality of fourth feature points corresponding to the plurality of third feature points, and
   determining a rotation matrix and a translation vector describing a rotation and a translation, respectively, between the plurality of third feature points and the plurality of fourth feature points.

5. The system of claim 4, wherein the iterative processing further includes, for each iteration of the first number of iterations, the following operations:
   determining all inlier feature points for the first camera image by rotating and translating each first feature point of the plurality of first feature points using the determined rotation matrix and translation vector, and
   determining an inlier ratio for the iteration based on determined inlier feature points and the number of first feature points in the plurality of first feature points.

6. The system of claim 5, wherein the iterative processing further includes:
   executing each iteration of the first number of iterations,
   determining, from among the first number of iterations, an iteration with a highest inlier ratio, and determining a final rotation matrix and a final translation vector based on the determined inlier feature points from the iteration with the highest inlier ratio.

7. The system of claim 6, wherein the iterative processing further includes:
   determining whether the highest inlier ratio exceeds a predetermined threshold,
   in response to determining that the highest inlier ratio does not exceed a predetermined threshold
      selecting a second number of iterations that is greater than the first number of iterations, and
      executing, for each iteration of the second number of iterations, each of the steps executed for the first number of iterations.

8. A computer-implemented method for determining motion of a machine, the method comprising:
   receiving a first camera image and a second camera image from a camera mounted on the machine, wherein the first camera image is received earlier in time than the second camera image,
   receiving, from a range detection unit mounted on the machine, a first range image corresponding to the first camera image,
   generating a first range map by fusing the first camera image and the first range image,
   iteratively processing a plurality of first features in the first range map and a plurality of second features in the second camera image to determine a change in position of the machine,
   wherein the change in position of the machine includes a rotation of the machine and a translation of the machine, and determining the rotation of the machine is based at least in part on the first range map,
   the plurality of second features correspond to the plurality of first features, and
   each of the first features and each of the second features are denoted by feature points in an image space of the camera.

9. The method of claim 8, wherein the range detection unit is a LIDAR unit, and the first range image is a 3D point cloud.

10. The method of claim 8, wherein the iterative processing includes selecting a first number of iterations based on a desired robustness and a desired inlier ratio,
   the inlier ratio is a ratio between a total number of inlier feature points from among the plurality of first feature points that fit an estimated model, and a total number of feature points in the plurality of first feature points, and
   the estimated model describes a rotation and a translation, respectively, between the first camera image and the second camera image.

11. The method of claim 10, wherein the iterative processing further includes, for each iteration of the first number of iterations, the following operations:
   selecting a plurality of third feature points from among the plurality of first feature points and a plurality of fourth feature points from among the plurality of second feature points, the plurality of fourth feature points corresponding to the plurality of third feature points, and
   determining a rotation matrix and a translation vector describing a rotation and a translation, respectively, between the plurality of third feature points and the plurality of fourth feature points.

12. The method of claim 11, wherein the iterative processing further includes, for each iteration of the first number of iterations, the following operations:
   determining all inlier feature points for the first camera image by rotating and translating each feature point of the plurality of first feature points using the determined rotation matrix and translation vector, and
   determining an inlier ratio for the iteration based on the determined inlier feature points and the number of feature points in the plurality of first feature points.

13. The method of claim 12, wherein the iterative processing further includes:
   executing each iteration of the first number of iterations,
   determining, from among the first number of iterations, an iteration with a highest inlier ratio, and
   determining a final rotation matrix and a final translation vector based on the determined inlier feature points from the iteration with the highest inlier ratio.

14. The method of claim 13, wherein the iterative processing further includes:
   determining whether the highest inlier ratio exceeds a predetermined threshold, and
   in response to determining that the highest inlier ratio does not exceed a predetermined threshold
      selecting a second number of iterations that is greater than the first number of iterations, and
      executing, for each iteration of the second number of iterations, each of the steps executed for the first number of iterations.

15. A machine comprising:
   a range detection unit mounted on the machine;
   a camera mounted on the machine; and
   a controller configured to execute instructions to perform operations including:
      receiving a first camera image and a second camera image from the camera, wherein the first camera image is received earlier in time than the second camera image,
      receiving, from the range detection unit, a first range image corresponding to the first camera image,
      generating a first range map by fusing the first camera image and the first range image, and
      iteratively processing a plurality of first features in the first range map and a plurality of second features in the second camera image to determine a change in position of the machine,
   wherein the change in position of the machine includes a rotation of the machine and a translation of the machine, and determining the rotation of the machine is based at least in part on the first range map,
   the plurality of second features correspond to the plurality of first features, and
   each feature of the plurality of first features and each feature of the plurality of second features are denoted by feature points in an image space of the camera.

16. The machine of claim 15, wherein the iterative processing includes selecting a first number of iterations based on a desired robustness and a desired inlier ratio,
   the inlier ratio is a ratio between a total number of inlier feature points from among the plurality of first feature points that fit an estimated model, and a total number of feature points in the plurality of first feature points, and
   the estimated model describes a rotation and a translation, respectively, between the first camera image and the second camera image.

17. The machine of claim 16, wherein the iterative processing further includes, for each iteration of the first number of iterations, the following operations:
  selecting a plurality of third feature points from among the plurality of first feature points and a plurality of fourth feature points from among the plurality of second feature points, the plurality of fourth feature points corresponding to the plurality of third feature points, and
  determining a rotation matrix and a translation vector describing a rotation and a translation, respectively, between the plurality of third feature points and the plurality of fourth feature points.

18. The machine of claim 17, wherein the iterative processing further includes, for each iteration of the first number of iterations, the following operations:
  determining all inlier feature points for the first camera image by rotating and translating each feature point of the plurality of first feature points using the determined rotation matrix and translation vector, and
  determining an inlier ratio for the iteration based on the determined inlier feature points and the number of first feature points in the plurality of first feature points.

19. The machine of claim 18, wherein the iterative processing further includes:
  executing each iteration of the first number of iterations,
  determining, from among the first number of iterations, an iteration with a highest inlier ratio, and
  determining a final rotation matrix and a final translation vector based on the determined inlier feature points from the iteration with the highest inlier ratio.

20. The machine of claim 19, wherein the iterative processing further includes:
  determining whether the highest inlier ratio exceeds a predetermined threshold, and
  in response to determining that the highest inlier ratio does not exceed a predetermined threshold
    selecting a second number of iterations that is greater than the first number of iterations, and
    executing, for each iteration of the second number of iterations, each of the steps executed for the first number of iterations.

* * * * *